(12) United States Patent
Hu et al.

(10) Patent No.: US 12,313,561 B2
(45) Date of Patent: May 27, 2025

(54) STROBOSCOPIC STEPPED ILLUMINATION DEFECT DETECTION SYSTEM

(71) Applicants: Casi Vision Technology (Luoyang) Co., Ltd., Luoyang (CN); Casi Vision Technology (Beijing) Co., Ltd., Beijing (CN)

(72) Inventors: Xiaosong Hu, Luoyang (CN); Bing Pian, Luoyang (CN); Wujie Zhang, Luoyang (CN); Hao Deng, Luoyang (CN); Chenglin Zhang, Luoyang (CN)

(73) Assignees: Casi Vision Technology (Beijing) Co., Ltd., Beijing (CN); Casi Vision Technology (Luoyang) Co., Ltd., Luoyang (CN)

( * ) Notice: Subject to any disclaimer, the term of this patent is extended or adjusted under 35 U.S.C. 154(b) by 145 days.

(21) Appl. No.: 18/276,242

(22) PCT Filed: Nov. 11, 2021

(86) PCT No.: PCT/CN2021/129951
§ 371 (c)(1),
(2) Date: Aug. 7, 2023

(87) PCT Pub. No.: WO2022/179186
PCT Pub. Date: Sep. 1, 2022

(65) Prior Publication Data
US 2024/0118218 A1 Apr. 11, 2024

(30) Foreign Application Priority Data
Feb. 25, 2021 (CN) .......................... 202110207353.9

(51) Int. Cl.
G01N 21/88 (2006.01)

(52) U.S. Cl.
CPC . *G01N 21/8806* (2013.01); *G01N 2021/8838* (2013.01)

(58) Field of Classification Search
CPC ............... G01N 21/88; G01N 21/8806; G01N 2021/8816; G01N 2021/8825; G01N 2021/8835; G01N 2021/8838
See application file for complete search history.

(56) References Cited

U.S. PATENT DOCUMENTS

| 4,223,346 | A | * | 9/1980 | Neiheisel | ........... G01N 21/8903 |
| | | | | | 250/559.46 |
| 7,042,172 | B2 | * | 5/2006 | Dowling | ............ G01N 21/8806 |
| | | | | | 315/318 |

(Continued)

FOREIGN PATENT DOCUMENTS

| CN | 103884650 A | 6/2014 |
| CN | 108362713 A | 8/2018 |

(Continued)

OTHER PUBLICATIONS

International Search Report and Written Opinion for International Application No. PCT/CN2021/129951 mailed Feb. 17, 2022.

(Continued)

*Primary Examiner* — Kevin K Pyo
(74) *Attorney, Agent, or Firm* — Wolf, Greenfield & Sacks, P.C.

(57) ABSTRACT

A stroboscopic stepped illumination defect detection system for appearance defect detection of a product is provided. The system includes an image extraction unit, a brightness adjustment unit, a data processing unit, and a stroboscopic control unit. The image extraction unit is connected to the stroboscopic control unit and used for obtaining stable and clear images in various transmission/reflection visual bright fields/dark fields; and the brightness adjustment unit is connected to the stroboscopic control unit and used for (Continued)

setting various transmission/reflection visual bright fields/dark fields and converting in the various transmission/reflection visual bright fields/dark fields.

12 Claims, 6 Drawing Sheets

(56) References Cited

U.S. PATENT DOCUMENTS

| | | |
|---|---|---|
| 7,551,274 B1 | 6/2009 | Wornson et al. |
| 2012/0199654 A1 | 8/2012 | Zhu et al. |
| 2019/0342481 A1 | 11/2019 | Sorgius |
| 2020/0134773 A1 | 4/2020 | Pinter et al. |
| 2021/0299879 A1 | 9/2021 | Pinter et al. |

FOREIGN PATENT DOCUMENTS

| | | |
|---|---|---|
| CN | 110023713 A | 7/2019 |
| CN | 110108720 A | 8/2019 |
| CN | 110404816 A | 11/2019 |
| CN | 110609039 A | 12/2019 |
| CN | 111007075 A | 4/2020 |
| CN | 111458343 A | 7/2020 |
| CN | 111707670 A | 9/2020 |
| CN | 112557408 A | 3/2021 |
| CN | 113865830 A | 12/2021 |
| JP | 2014-190853 A | 10/2014 |
| WO | WO 2013/041216 A1 | 3/2013 |

OTHER PUBLICATIONS

First Office Action for Chinese Application No. 202110207353.9 dated Apr. 7, 2021.
Second Office Action for Chinese Application No. 202110207353.9 dated Apr. 25, 2021.
Notification to Grant Patent for Chinese Application No. 202110207353.9 dated May 28, 2021.

\* cited by examiner

STROBOSCOPIC STEPPED ILLUMINATION DEFECT DETECTION SYSTEM

CROSS-REFERENCE TO RELATED APPLICATIONS

The present invention is a national stage filing under 35 U.S.C. § 371 of international PCT application PCT/CN2021/129951, filed Nov. 11, 2021, which claims the benefit of Chinese patent application number CN 202110207353.9 filed with the Chinese Patent Office on Feb. 25, 2021, and entitled "Stroboscopic Stepped Illumination Defect Detection System," each of which is herein incorporated by reference in its entirety.

TECHNICAL FIELD

The present disclosure relates to the technical field of machine vision defect detection, and in particular, to a machine vision appearance defect detection system with multiple cameras and stroboscopic stepped illumination and an implementation method thereof.

BACKGROUND ART

The machine vision system converts a captured target into image signals by an image capturing device (divided into two types, i.e., CMOS and CCD sensor), and transmits the image signals to a dedicated image processing system, and the image system performs various operations on these signals so as to extract features of the target. Basic components thereof generally include a camera, a lens, a light source, an image acquisition card, an image processor, an image processing software, and an algorithm.

At present, the machine vision system has been deeply applied in industrial detection systems for identifying information on products, measuring sizes of products, detecting defects of products and other links. In the above, because users have quite high requirements on appearance of 3C type consumer electronic products, it is particularly important to detect appearance defects of a product during production of the product.

These defects include scratches, edge breakages, concave and convex points, sprouts, nicks, jagged edges, light transmission, smearing, broken filaments/fibers, skip printing, misprinting, IR holes and major hole flaws and so on in silk-screen printing areas, and require detection accuracy to reach a micron level, while it is very hard for human eyes to meet such high accuracy and 24-hour high-strength operating requirements.

In industrial production, the existing image acquisition technical modes of product appearance defect detection can be classified into three types.

The first one is to use a high-accuracy area scan camera and a light source to acquire pictures of reflection or transmission, bright field or dark field of a product with a suitable shooting angle and light intensity, and then perform information process on target. Such solution can acquire most product features and is widely applied, but disadvantages are that industrial pipelines are often moving, influence of motion needs to be eliminated from an image, moreover, due to limitation of resolution of the existing area scan camera, a micron-level defect in the 3C consumption products cannot always be identified, or in this case, requirements to an image processing algorithm are extremely high, and currently can hardly be met.

The second one is to use 3D vision technology. The 3D vision technology includes binocular vision, structured light, TOF (Time of Flight), triangulation, laser radar and so on, and these technologies currently are widely applied in identification, measurement, and positioning of three-dimensional objects, but rarely applied in defect detection, and also can hardly meet the micron-level high accuracy requirements of 3C type products.

The third one is to use a line scan camera and a light source to acquire images of reflection bright field, reflection dark field, transmission bright field, and transmission dark field of a target object, and then provide the images to a computer system for processing. Advantages of such solution are that resolution of the line scan camera is high, and can identify a micron-level defect, moreover, the solution of combining the line scan camera and the light source, in combination with an encoder of a motion system, is particularly suitable to application in industrial pipelines, therefore, current high-accuracy defect detection systems generally adopt such solution.

However, in the prior art, defects reflected by pictures of four scenes (reflection bright field, reflection dark field, transmission bright field, and transmission dark field) of a detected object acquired by the detection system of the line scan camera are always limited, since a shooting speed of the line scan camera is fixed, and a driving current of the light source corresponding to a shooting angle is fixed, it is often necessary to change a turning-on pulse width of corresponding light source to photograph different defects, while a maximum turning-on pulse width of the light source is exposure time of the line scan camera, and a wider pulse width is useless for the line scan camera, thus, it greatly restricts the number of pictures to be taken, as well as types of defects detected. Moreover, since the current of a drive circuit corresponding to a single light source is fixed, when taking pictures of different bright fields or dark fields with varying illumination angles, it is usually not to use this light source in each defect at the same time, so that utilization rate of the light source is very low, and the number of types of defects simultaneously photographed is few. In this case, the number of light sources and cameras has to be increased, so as to take desired pictures or more types of defects, which increases costs and complexity of the system.

SUMMARY

In view of shortcomings existing in the prior art, the present disclosure discloses a stroboscopic stepped illumination defect detection system. The detect detection system of the present disclosure achieves an objective of multi-directional imaging of various defects, through stroboscopic stepped control over light sources, i.e., simultaneously changing turning-on pulse widths and operating current values of the light sources, and using multiple light sources to operate collaboratively, under the condition of using multiple cameras. Furthermore, with a solution of preferred embodiment of double cameras, in operation of one assembly line station, the present disclosure can take more pictures of bright and dark fields of an object, improve utilization rate of the light sources, increase types and number of detectable defects, and realize an image acquisition effect that has to be achieved by 4-8 cameras in the prior art.

In order to solve the above technical problems, the present disclosure provides a stroboscopic stepped illumination defect detection system, for appearance defect detection of a product, including: an image extraction unit (101), a brightness adjusting unit (102), a data processing unit (103), and a stroboscopic control unit (104).

The image extraction unit (101) is connected to the stroboscopic control unit (104), and is configured to acquire stable and clear images in various transmission/reflection visual bright fields/dark fields;

the brightness adjustment unit (102) is connected to the stroboscopic control unit (104), and is configured to set various transmission/reflection visual bright fields/dark fields and convert in the various transmission/reflection visual bright fields/dark fields;

the data processing unit (103) is connected to the stroboscopic control unit (104), and is configured to generate a pulse encoding signal, generate an enable signal after detecting a to-be-detected product, and transmit the enable signal to the stroboscopic control unit (104);

the stroboscopic control unit (104) is connected to the image extraction unit (101), the brightness adjustment unit (102), and the data processing unit (103) respectively, and is configured to: record the signal transmitted by the data processing unit (103) in real time, and perform frequency multiplication and/or frequency division on the signal; control the image extraction unit (101) to acquire an image, using the signal having undergone the frequency multiplication and/or frequency division; and control, using the signal having undergone the frequency multiplication and/or frequency division, the brightness adjustment unit (102) to set transmission/reflection visual bright fields/dark fields, and convert in various transmission/reflection visual bright fields/dark fields.

Preferably, the image extraction unit (101) further includes a plurality of cameras; and the brightness adjustment unit (102) further includes a plurality of light sources.

Preferably, the data processing unit (103) further includes an encoder and a PLC controller; and the stroboscopic control unit (104) further includes a stroboscopic control circuit, a drive circuit, an input interface circuit, and an output interface circuit.

Preferably, the image extraction unit (101) further includes two cameras; the cameras are line scan cameras; and the brightness adjustment unit (102) further includes a plurality of light sources.

Preferably, the cameras are line scan cameras; the encoder generates a corresponding pulse encoding signal according to a rotating speed of a mechanical rotating system; the PLC controller is a programmable controller, which generates an enable signal after detecting a to-be-detected object and provides the enable signal to the stroboscopic control unit (104).

Preferably, the drive circuit outputs a constant current signal for driving the brightness adjustment unit (102); can set a pulse width and a period of an output current under PWM control; can set any different numerical values for the pulse width in each period; and can set any different numerical values for the output current in each pulse width of PWM modulation.

Preferably, in the plurality of cameras and the plurality of light sources, the first camera is located in the reflection bright field of the first light source, and the second camera is located in the transmission bright field of the first light source; and meanwhile, the first camera is located in the reflection dark field of the second light source, and the second camera is located in the transmission dark field of the second light source.

Preferably, the stroboscopic control unit (104) is further configured to record the signal of the encoder in real time and acquire a rising edge and a period;

the stroboscopic control unit (104) is further configured to perform frequency multiplication and/or frequency division on the signal of the encoder according to a running speed, the number of pictures to be taken or defect types, and camera parameters;

the stroboscopic control unit (104) is further configured to judge whether enabling of the PLC controller is valid, wherein if it is not valid, it returns to the preceding step; and if it is invalid, subsequent signal output is performed;

the stroboscopic control unit (104) is further configured to control the drive circuits of reflection bright field light sources corresponding to various cameras to perform stroboscopic stepped lighting and picture taking, according to the signal having undergone the frequency multiplication and/or frequency division as an output line trigger signal;

the stroboscopic control unit (104) is further configured to control the drive circuits of reflection dark field light sources corresponding to various cameras to perform stroboscopic stepped lighting and picture taking, according to the signal having undergone the frequency multiplication and/or frequency division as an output line trigger signal;

the stroboscopic control unit (104) is further configured to control the drive circuits of transmission bright field light sources corresponding to various cameras to perform stroboscopic stepped lighting and picture taking, according to the signal having undergone the frequency multiplication and/or frequency division as an output line trigger signal;

the stroboscopic control unit (104) is further configured to control the drive circuits of transmission dark field light sources corresponding to various cameras to perform stroboscopic stepped lighting and picture taking, according to the signal having undergone the frequency multiplication and/or frequency division as an output line trigger signal; and the stroboscopic control unit (104) is further configured to control various cameras and the drive circuits of corresponding light sources to perform stroboscopic stepped lighting and picture taking, according to the signal having undergone the frequency multiplication and/or frequency division as an output line trigger signal.

In order to solve the above technical problems, the present disclosure further provides a stroboscopic stepped illumination defect detection method (a method for detecting stroboscopic stepped illumination defect), including the following steps:

step 1, selecting cameras and light sources: according to defect types to be detected by a system and/or the number of pictures to be taken, selecting a first camera, a second camera, a first light source, and a second light source adapted thereto;

step 2, mounting an imaging system: according to defects to be imaged, determining angles and positions of the light sources, the first camera, and the second camera preliminarily and structurally, debugging the angles and positions of the first camera and the second camera for each defect to be tested respectively, wherein when image data needs to be added, adding a supplemental third camera and a supplemental fourth camera until a supplemental M-th camera is added, where M is a positive integer greater than 3; and fixing positions of devices according to bright field and dark field requirements preliminarily;

step 3, setting encoder parameters: according to a speed of detecting a product by the system, setting a rate of a motion system, and obtaining a period of the encoder correspondingly;

step 4, setting a stroboscopic control unit: according to the period of the encoder, the number of pictures to be taken, and parameters of the cameras, setting frequency multiplication and frequency division parameters of the stroboscopic control unit, and setting parameters of stroboscopic stepped illumination preliminarily;

step 5, debugging optical parameters: for each defect to be tested, debugging the angles of the first light source and the second light source respectively, wherein and when light supplementation is required, adding a third light source for supplementing light, a fourth light source for supplementing light until an N-th light source for supplementing light, where N is a positive integer greater than 3; and fixing positions of various devices after the debugging is completed, so that there is no relative displacement or angular rotation therebetween;

step 6, debugging the stroboscopic control unit: for each defect to be tested, debugging strobing and step parameters respectively, and correcting pulse widths and operation current values of corresponding light sources, to ensure that a grayscale value of an image taken falls within an acceptable set range;

step 7, imaging splitting: splitting multiple lines of images taken by line scan cameras in a computer system;

step 8, judging imaging definition: judging whether image defect imaging definition reaches a set threshold; wherein if the definition does not reaches the set threshold, it returns to step 5; and if the definition reaches the set threshold, the next step is performed; and step 9, data analysis: debugging software and algorithm defect by a computer system to perform data analysis and complete the detection.

In order to solve the above technical problems, the present disclosure further provides a double-camera stroboscopic stepped illumination defect detection method, using only two cameras therein, and including the following steps:

step 1, selecting cameras and light sources: according to defect types to be detected by a system and/or the number of pictures to be taken, selecting a first camera, a second camera, a first light source, and a second light source adapted thereto;

step 2, mounting an imaging system: according to defects to be imaged, determining angles and positions of the light sources, the first camera, and the second camera preliminarily and structurally, and fixing positions of devices according to bright field and dark field requirements preliminarily;

step 3, setting encoder parameters: according to a speed of detecting a product by the system, setting a rate of a motion system, and obtaining a period of the encoder correspondingly;

step 4, setting a stroboscopic control unit: according to the period of the encoder, the number of pictures to be taken, and parameters of the cameras, setting frequency multiplication and frequency division parameters of the stroboscopic control unit, and setting parameters of stroboscopic stepped illumination preliminarily;

step 5, debugging optical parameters: for each defect to be tested, debugging angles of the first light source and the second light source respectively, wherein when light supplementation is required, adding a third light source for supplementing light, a fourth light source for supplementing light until an N-th light source for supplementing light, where N is a positive integer greater than 3; and fixing positions of various devices after the debugging is completed, so that there is no relative displacement or angular rotation therebetween;

step 6, debugging the stroboscopic control unit: for each defect to be tested, debugging strobing and step parameters respectively, and correcting pulse widths and operation current values of corresponding light sources, to ensure that a grayscale value of an image taken falls within an acceptable set range;

step 7, splitting images: splitting multiple lines of images taken by line scan cameras in a computer system;

step 8, judging imaging definition: judging whether image defect imaging definition reaches a set threshold, wherein if the definition does not reaches the set threshold, it returns to step 5; and if the definition reaches the set threshold, the next step is performed; and step 9, data analysis: debugging software and algorithm defect by a computer system to perform data analysis and complete the detection.

Preferably, the stroboscopic control unit is configured to record the signal of the encoder in real time and acquire a rising edge and a period;

preferably, the stroboscopic control unit is configured to perform frequency multiplication and/or frequency division on the signal of the encoder according to a running speed, the number of pictures to be taken or defect types, and camera parameters;

preferably, the stroboscopic control unit is configured to judge whether enabling of the PLC controller is valid, wherein if it is not valid, it returns to the preceding step; and if it is invalid, subsequent signal output is performed;

preferably, the stroboscopic control unit is configured to control drive circuits of reflection bright field light sources corresponding to various cameras to perform stroboscopic stepped lighting and picture taking, according to the signal having undergone the frequency multiplication and/or frequency division as an output line trigger signal;

preferably, the stroboscopic control unit is configured to control drive circuits of reflection dark field light sources corresponding to various cameras to perform stroboscopic stepped lighting and picture taking, according to the signal having undergone the frequency multiplication and/or frequency division as an output line trigger signal;

preferably, the stroboscopic control unit is configured to control drive circuits of transmission bright field light sources corresponding to various cameras to perform stroboscopic stepped lighting and picture taking, according to the signal having undergone the frequency multiplication and/or frequency division as an output line trigger signal;

preferably, the stroboscopic control unit is configured to control drive circuits of transmission dark field light sources corresponding to various cameras to perform stroboscopic stepped lighting and picture taking, according to the signal having undergone the frequency multiplication and/or frequency division as an output line trigger signal; and preferably, the stroboscopic control unit is configured to control various cameras and the drive circuits of corresponding light sources to perform stroboscopic stepped lighting and picture taking, according to the signal having undergone the frequency multiplication and/or frequency division as an output line trigger signal.

Beneficial effects of the present disclosure include:
(1) using the solution of combination of the line scan cameras, the encoder, and the PLC controller, it can be ensured that micron-level defects of the consumer 3C products are detected, and the solution is quite suitable for installation in production assembly lines;
(2) with a plurality of cameras, through stroboscopic and stepped adjustment of the drive currents of the light sources, characteristics of each kind of light source can be fully utilized, a plurality of lighting effects are realized, and capability of photographing complex defects is improved;
(3) in operation of one assembly line station, since the pulse width and drive current value (corresponding to luminance) of each light source in different periods are adjustable, more pictures of bright and dark fields can be taken, improving the types and the number of detectable defects; and
(4) a dedicated stroboscopic control unit is used to acquire signals of the encoder and the PLC controller and control the light sources and the cameras, and can realize flexible adjustment of the system and meet upgrading requirements.

For further technical effects, in the solution of the embodiments in which double cameras are preferably used in the present disclosure, more pictures of bright and dark fields of the object can be taken, thus improving the utilization rate of the light sources, increasing the types and the number of detectable defects, and realizing the image acquisition effect that has to be achieved by 4-8 cameras in the prior art.

BRIEF DESCRIPTION OF DRAWINGS

In order to more clearly illustrate technical solutions in embodiments of the present disclosure or the prior art, drawings which need to be used in the description of the embodiments or the prior art will be introduced briefly below, and apparently, the drawings in the description below merely show some embodiments or the prior art, and those ordinarily skilled in the art still could obtain other similar or relevant drawings in light of these drawings, without using any creative efforts.

DETAILED DESCRIPTION OF EMBODIMENTS

Figure 1:
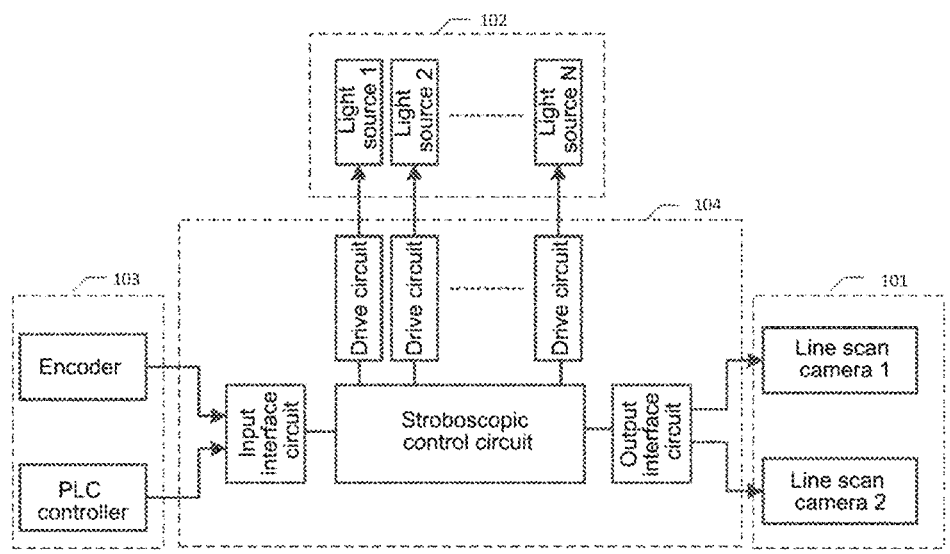
FIG. 1 is a block diagram of composition of a stroboscopic stepped illumination defect detection system according to an embodiment of the present disclosure.

The present disclosure is described in detail below with reference to embodiments. In order to make the objectives, technical solutions, and advantages of the present disclosure clearer and more explicit, the present disclosure is further described in detail, but the present disclosure is not limited to these embodiments.

An appearance defect detection system with multiple cameras and stroboscopic stepped illumination in the present disclosure belongs to the field of machine vision, and composition of the system includes a first camera, a second camera, light sources, an encoder, a PLC controller, and a stroboscopic control unit; the first camera and the second camera are line scan cameras; the light sources at least include a first light source and a second light source; the encoder generates a corresponding pulse encoding signal according to a rotating speed of a mechanical rotating system; the PLC controller is a programmable controller, which generates an enable signal after detecting a to-be-detected object and provides the enable signal to the stroboscopic control unit; the stroboscopic control unit includes an input interface circuit, an output interface circuit, a stroboscopic control circuit, and drive circuits of a plurality of light sources. By simultaneously changing turning-on pulse widths and operating current values of the light sources, and using a plurality of light sources to operate collaboratively, the present disclosure achieves an objective of multi-directional lighting and imaging of various defects, increasing the types of detectable defects, and improving the efficiency of a machine vision appearance defect detection system.

An appearance defect detection system with double cameras and stroboscopic stepped illumination includes a first camera, a second camera, light sources, an encoder, a PLC controller, and a stroboscopic control unit; the first camera and the second camera are line scan cameras; the light sources at least include a first light source and a second light source; the encoder generates a corresponding pulse encoding signal according to a rotating speed of a mechanical rotating system; the PLC controller is a programmable controller, which generates an enable signal, after detecting a to-be-detected object, and provides the enable signal to the stroboscopic control unit; and the stroboscopic control unit includes an input interface circuit, an output interface circuit, a stroboscopic control circuit, and drive circuits of a plurality of light sources.

Various light sources in the light sources are LED light sources, which may be one or a combination of several of line light sources, planar light sources, annular light sources, square light sources, strip light sources, dome light sources, planar shadowless light sources, coaxial light sources, ultraviolet light sources, infrared light sources, point light sources and so on.

For a machine vision appearance defect detection system with double cameras and stroboscopic stepped control, in addition to the first light source and the second light source, the light sources therein further may include a third light source, or a fourth light source, or a third light source to an N-th light source, where N is any natural number greater than "3"; positions of the third light source to the N-th light source in principle may be at any point in XYZ three-dimensional coordinates, as long as they do not affect photographing lines of the first camera and the second camera or optical paths of the first light source and the second light source; the third light source to the N-th light source function to cooperate with the first light source and the N-th light source so as to supplement light to the to-be-detected object, so that the first camera and the second camera photograph various different defects in appearance of a product.

For the stroboscopic control unit, a drive circuit therein has the following characteristics: outputting a constant current signal, for driving the light sources; supporting stroboscopic adjustment, that is, a pulse width and a period of an output current under PWM control can be set, in particular, the pulse width can be different in each period; supporting stepped current adjustment, that is, in each pulse width of PWM modulation, an output current value can be set to be different, and the output current value can be randomly set between 0 A and the maximum output current.

For the machine vision appearance defect detection system with double cameras and stroboscopic stepped control, positional relationship of various components in the system is that: the to-be-detected object is placed in the mechanical rotating system to perform a uniform linear movement, taking a movement direction as an X axis, a central point of lighting of the first light source and the second light source as an origin O, a central line of a strip-shaped region of the object to be photographed as a Y axis, and from the origin upwards as a Z axis, centers of the first camera, the second camera, and the first light source and the second light source in the light sources are all in an XOZ plane, wherein the first light source forms an included angle a with the X axis, and the second light source forms an included angle b with the X axis; the first camera is in a reflection bright field of the first light source, the second camera is in a transmission bright field of the second light source, and meanwhile, the first camera is in a reflection dark field of the second light source, and the second camera is in a transmission dark field of the second light source.

For the machine vision appearance defect detection system with double cameras and stroboscopic stepped control, an operation method of the stroboscopic control unit is that: first, recording an encoder signal in real time, and acquiring a rising edge and a period; second, performing frequency multiplication and frequency division on the encoder signal according to a running speed, the number of pictures to be taken (defect types), camera parameters, etc.; third, judging whether enabling of the PLC controller is valid, wherein if it is not invalid, it returns to step 2; and if it is valid, subsequent signal output is performed; fourth, using the signal having undergone the frequency multiplication and frequency division as an output line trigger signal to control the drive circuits of the reflection bright field light sources corresponding to the first camera and the second camera, to perform stroboscopic stepped lighting and picture taking; fifth, by the same reasoning, using the line trigger signal to control the drive circuits of the reflection dark field light sources corresponding to the first camera and the second camera, to perform stroboscopic stepped lighting and picture taking; sixth, by the same reasoning, using the line trigger signal to control the second camera and the drive circuit of the transmission bright field light source corresponding to the second camera, to perform stroboscopic stepped lighting and picture taking; seventh, using the line trigger signal to control the second camera and the drive circuit of the transmission dark field light source corresponding to the second camera, to perform stroboscopic stepped lighting and picture taking; eighth, by the same reasoning, using the line trigger signal to control the first camera and/or the second camera and the drive circuits of the corresponding sources, to perform stroboscopic stepped lighting and picture taking, until all lighting is completed; and ninth, outputting the lines of all of the pictures taken cyclically, wherein if it is not completed, it returns to step 3; and if it is completed, the defect detection of one product is finished.

For the machine vision appearance defect detection system with double cameras and stroboscopic stepped control, a detection method thereof includes the following procedures: first, selecting cameras and light sources: selecting suitable first camera and second camera, and first light source, second light source to N-th light source according to defect types to be detected by the system or the number of pictures to be taken; second, mounting a system: according to defects to be imaged, determining angles and positions of the light sources, the first camera, and the second camera preliminarily and structurally, and fixing positions of devices preliminarily according to bright field and dark field requirements; third, setting encoder parameters: according to a speed of detecting a product by the system, setting a rate of a motion system, and obtaining a period of the encoder correspondingly; fourth, setting the stroboscopic control unit: according to the period of the encoder, the number of pictures to be taken, parameters of the cameras and so on, setting frequency multiplication and frequency division parameters of the stroboscopic control unit, and setting parameters of stroboscopic stepped illumination preliminarily; fifth, debugging optical parameters: for each defect, debugging the angles of the first light source and the second light source respectively, wherein when light supplementation is required, adding a third light source for supplementing light until an N-th light source for supplementing light is added, and fixing the positions of the devices after the debugging is completed; sixth, debugging the stroboscopic control unit: for each defect, debugging strobing and step parameters respectively, i.e. correcting pulse widths and operation current values of corresponding light sources, so that a grayscale value of an image taken is within an acceptable range; seventh, splitting multiple lines of images taken by the line scan cameras in a computer (if there is a problem in image splitting, for example, a situation where wrong images or image overlapping occurs, returning to the fourth step to modify parameters); eighth: judging whether the defect is clearly imaged, wherein if not, it returns to the fifth step, and if so, it proceeds forward; and ninth, debugging, in a computer, software and algorithm defect to perform analysis.

A stroboscopic stepped illumination defect detection system according to an embodiment of the present disclosure is used for appearance defect detection of a product, including: an image extraction unit (101), a brightness adjusting unit (102), a data processing unit (103), and a stroboscopic control unit (104).

The image extraction unit (101) is connected to the stroboscopic control unit (104), and is configured to acquire stable and clear images in various transmission/reflection visual bright fields/dark fields.

The brightness adjustment unit (102) is connected to the stroboscopic control unit (104), and is configured to set various transmission/reflection visual bright fields/dark fields and convert in the various transmission/reflection visual bright fields/dark fields.

The data processing unit (103) is connected to the stroboscopic control unit (104), and is configured to generate a pulse encoding signal, generate an enable signal after detecting a to-be-detected product, and transmit the enable signal to the stroboscopic control unit (104).

The stroboscopic control unit (104) is connected to the image extraction unit (101), the brightness adjustment unit (102), and the data processing unit (103) respectively, and is configured to record the signal transmitted by the data processing unit (103) in real time, and perform frequency multiplication and/or frequency division on the signal; control, using the signal having undergone the frequency multiplication and/or frequency division, the image extraction unit (101) to acquire an image; and control, using the signal having undergone the frequency multiplication and/or frequency division, the brightness adjustment unit (102) to set transmission/reflection visual bright fields/dark fields, and perform converting in the various transmission/reflection visual bright fields/dark fields.

Preferably, the image extraction unit (101) further includes a plurality of cameras; and the brightness adjustment unit (102) further includes a plurality of light sources.

Preferably, the data processing unit (103) further includes an encoder and a PLC controller; and the stroboscopic control unit (104) further includes a stroboscopic control circuit, a drive circuit, an input interface circuit, and an output interface circuit.

Preferably, the image extraction unit (101) further includes two cameras; the cameras are line scan cameras; and the brightness adjustment unit (102) further includes a plurality of light sources.

Preferably, the cameras are line scan cameras; the encoder generates a corresponding pulse encoding signal according to a rotating speed of a mechanical rotating system; the PLC controller is a programmable controller, which generates an enable signal after detecting a to-be-detected object and provides the enable signal to the stroboscopic control unit (104).

Preferably, the drive circuit outputs a constant current signal for driving the brightness adjustment unit (102); can set a pulse width and a period of the output current under PWM control; can set any different numerical values for the pulse width in each period; and can set any different numerical values for the output current in each pulse width of PWM modulation.

Preferably, in the plurality of cameras and the plurality of light sources, the first camera is located in the reflection bright field of the first light source, and the second camera is located in the transmission bright field of the first light source; and meanwhile, the first camera is located in the reflection dark field of the second light source, and the second camera is located in the transmission dark field of the second light source.

Preferably, the stroboscopic control unit (104) is further configured to record the signal of the encoder in real time and acquire a rising edge and a period;

the stroboscopic control unit (104) is further configured to perform frequency multiplication and/or frequency division on the signal of the encoder according to a running speed, the number of pictures to be taken or defect types, and camera parameters;

the stroboscopic control unit (104) is further configured to judge whether enabling of the PLC controller is valid, wherein if it is not valid, it returns to the preceding step; and if it is invalid, subsequent signal output is performed;

the stroboscopic control unit (104) is further configured to control the drive circuits of the reflection bright field light sources corresponding to various cameras to perform stroboscopic stepped lighting and picture taking, according to the signal having undergone the frequency multiplication and/or frequency division as an output line trigger signal;

the stroboscopic control unit (104) is further configured to control the drive circuits of the reflection dark field light sources corresponding to various cameras to perform stroboscopic stepped lighting and picture taking, according to the signal having undergone the frequency multiplication and/or frequency division as an output line trigger signal;

the stroboscopic control unit (104) is further configured to control the drive circuits of the transmission bright field light sources corresponding to various cameras to perform stroboscopic stepped lighting and picture taking, according to the signal having undergone the frequency multiplication and/or frequency division as an output line trigger signal;

the stroboscopic control unit (104) is further configured to control the drive circuits of the transmission dark field light sources corresponding to various cameras to perform stroboscopic stepped lighting and picture taking, according to the signal having undergone the frequency multiplication and/or frequency division as an output line trigger signal; and the stroboscopic control unit (104) is further configured to control various cameras and the drive circuits of corresponding light sources to perform stroboscopic stepped lighting and picture taking, according to the signal having undergone the frequency multiplication and/or frequency division as an output line trigger signal.

A stroboscopic stepped illumination defect detection method according to an embodiment of the present disclosure, including the following steps:

step 1, selecting cameras and light sources: according to defect types to be detected by a system and/or the number of pictures to be taken, selecting a first camera, a second camera, a first light source, and a second light source adapted thereto;

step 2, mounting an imaging system: according to defects to be imaged, determining angles and positions of the light sources, the first camera, and the second camera preliminarily and structurally, debugging the angles and positions of the first camera and the second camera for each defect to be tested respectively, wherein when image data needs to be added, adding a supplemental third camera and a supplemental fourth camera until a supplemental M-th camera is added, where M is a positive integer greater than 3; and fixing positions of devices according to bright field and dark field requirements preliminarily;

step 3, setting encoder parameters: according to a speed of detecting a product by the system, setting a rate of a motion system, and obtaining a period of the encoder correspondingly;

step 4, setting a stroboscopic control unit: according to the period of the encoder, the number of pictures to be taken, and parameters of the cameras, setting frequency multiplication and frequency division parameters of the stroboscopic control unit, and setting parameters of stroboscopic stepped illumination preliminarily;

step 5, debugging optical parameters: for each defect to be tested, debugging the angles of the first light source and the second light source respectively, wherein when light supplementation is required, adding a third light source for supplementing light, a fourth light source for supplementing light until an N-th light source for supplementing light, where N is a positive integer greater than 3; and fixing the positions of various devices after the debugging is completed, so that there is no relative displacement or angular rotation therebetween;

step 6, debugging the stroboscopic control unit: for each defect to be tested, debugging strobing and step parameters respectively, and correcting pulse widths and operation current values of corresponding light sources, to ensure that a grayscale value of an image taken falls within an acceptable set range;

step 7, imaging splitting: splitting multiple lines of images taken by line scan cameras in a computer system;

step 8, judging imaging definition: judging whether image defect imaging definition reaches a set threshold, wherein if the definition does not reaches the set threshold, it returns to step 5; and if the definition reaches the set threshold, the next step is performed; and step 9, data analysis: debugging software and algorithm defect by a computer system to perform data analysis and complete the detection.

A double-camera stroboscopic stepped illumination defect detection method according to an embodiment of the present disclosure, using only two cameras, including the following steps:

step 1, selecting cameras and light sources: according to defect types to be detected by the system and/or the number of pictures to be taken, selecting a first camera, a second camera, a first light source, and a second light source adapted thereto;

step 2, mounting an imaging system: according to defects to be imaged, determining angles and positions of the light sources, the first camera, and the second camera preliminarily and structurally, and fixing positions of devices according to bright field and dark field requirements preliminarily;

step 3, setting encoder parameters: according to a speed of detecting a product by the system, setting a rate of a motion system, and obtaining a period of the encoder correspondingly;

step 4, setting a stroboscopic control unit: according to the period of the encoder, the number of pictures to be taken, and parameters of the cameras, setting frequency multiplication and frequency division parameters of the stroboscopic control unit, and setting parameters of stroboscopic stepped illumination preliminarily;

step 5, debugging optical parameters: for each defect to be tested, debugging angles of the first light source and the second light source respectively, wherein when light supplementation is required, adding a third light source for supplementing light, a fourth light source for supplementing light until an N-th light source for supplementing light, where N is a positive integer greater than 3; and fixing the positions of various devices after the debugging is completed, so that there is no relative displacement or angular rotation therebetween;

step 6, debugging the stroboscopic control unit: for each defect to be tested, debugging strobing and step parameters respectively, and correcting pulse widths and operation current values of corresponding light sources, to ensure that a grayscale value of an image taken falls within an acceptable set range;

step 7, splitting images: splitting multiple lines of images taken by the line scan cameras in a computer system;

step 8, judging imaging definition: judging whether image defect imaging definition reaches a set threshold, wherein if the definition does not reaches the set threshold, it returns to step 5; and if the definition reaches the set threshold, the next step is performed; and step 9, data analysis: debugging software and algorithm defect by a computer system to perform data analysis and complete the detection.

Preferably, the stroboscopic control unit is configured to record the signal of the encoder in real time and acquire a rising edge and a period;

preferably, the stroboscopic control unit is configured to perform frequency multiplication and/or frequency division on the signal of the encoder according to a running speed, the number of pictures to be taken or defect types, and camera parameters;

preferably, the stroboscopic control unit is configured to judge whether enabling of the PLC controller is valid, wherein if it is not valid, it returns to the preceding step; and if is invalid, subsequent signal output is performed;

preferably, the stroboscopic control unit is configured to control drive circuits of reflection bright field light sources corresponding to various cameras to perform stroboscopic stepped lighting and picture taking, according to the signal having undergone the frequency multiplication and/or frequency division as an output line trigger signal;

preferably, the stroboscopic control unit is configured to control drive circuits of reflection dark field light sources corresponding to various cameras to perform stroboscopic stepped lighting and picture taking, according to the signal having undergone the frequency multiplication and/or frequency division as an output line trigger signal;

preferably, the stroboscopic control unit is configured to control drive circuits of transmission bright field light sources corresponding to various cameras to perform stroboscopic stepped lighting and picture taking, according to the signal having undergone the frequency multiplication and/or frequency division as an output line trigger signal;

preferably, the stroboscopic control unit is configured to control drive circuits of the transmission dark field light sources corresponding to various cameras to perform stroboscopic stepped lighting and picture taking, according to the signal having undergone the frequency multiplication and/or frequency division as an output line trigger signal; and preferably, the stroboscopic control unit is configured to control various cameras and the drive circuits of corresponding light sources to perform stroboscopic stepped lighting and picture taking, according to the signal having undergone the frequency multiplication and/or frequency division as an output line trigger signal.

Embodiment 1

As shown in FIG. 1, it is a block diagram of composition of a stroboscopic stepped illumination defect detection system according to an embodiment of the present disclosure. In the above, the defect detection system includes: an image extraction unit (101), a brightness adjustment unit (102), a data processing unit (103), and a stroboscopic control unit (104). The image extraction unit (101) further includes a plurality of cameras; and the brightness adjustment unit (102) further includes a plurality of light sources. The data processing unit (103) further includes an encoder and a PLC controller; and the stroboscopic control unit (104) further includes a stroboscopic control circuit, a drive circuit, an input interface circuit, and an output interface circuit. The encoder generates a corresponding pulse encoding signal according to a rotating speed of a mechanical rotating system; the PLC controller is a programmable controller, which generates an enable signal after detecting a to-be-detected object and provides the enable signal to the stroboscopic control unit; and the stroboscopic control unit (104) includes an input interface circuit, an output interface circuit, a stroboscopic control circuit, and drive circuits of a plurality of light sources.

Various light sources in the light sources are LED light sources, which may be one or a combination of several of line light sources, planar light sources, annular light sources, square light sources, strip light sources, dome light sources, planar shadowless light sources, coaxial light sources, ultraviolet light sources, infrared light sources, point light sources and so on.

For the stroboscopic control unit, a drive circuit therein has the following characteristics: outputting a constant current signal, for driving the light sources; supporting stroboscopic adjustment, that is, a pulse width and a period of an output current under PWM control can be set, in particular, the pulse width can be different in each period; supporting stepped current adjustment, that is, in each pulse width of PWM modulation, an output current value can be set to be different, and the output current value can be randomly set between 0 A and the maximum output current.

Figure 2:
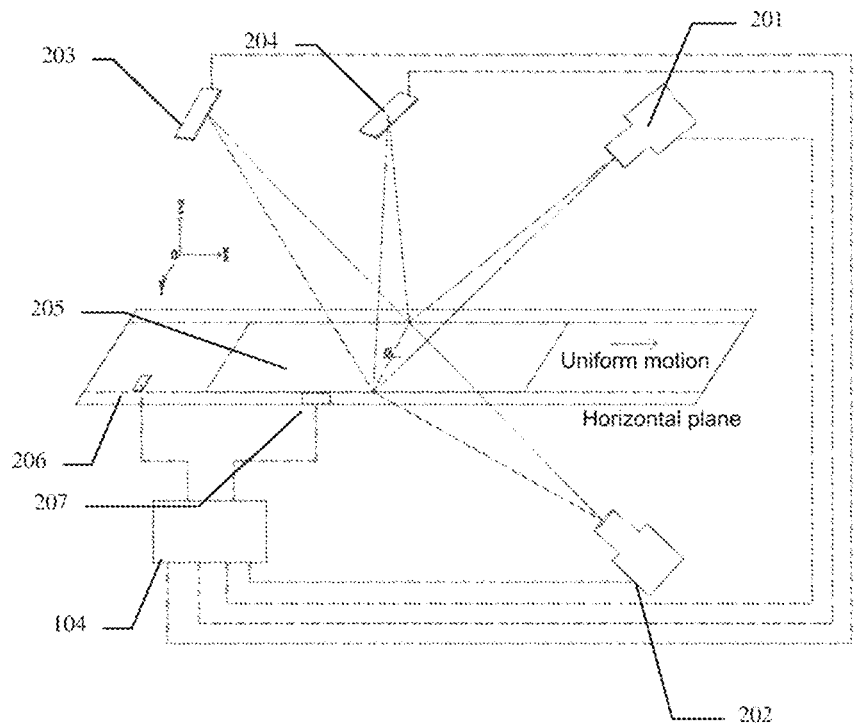
FIG. 2 is a structural schematic diagram of the stroboscopic stepped illumination defect detection system according to an embodiment of the present disclosure.

As shown in FIG. 2, it is a structural schematic diagram of the stroboscopic stepped illumination defect detection system according to an embodiment of the present disclosure. In the above, various components respectively are: a first camera 201, a second camera 202, a first light source 203, a second light source 204, a to-be-detected object 205, an encoder 206, a PLC controller 207, and a stroboscopic control unit 104.

Various components in the system have the following positional relationship: the to-be-detected object is placed in the mechanical rotating system to perform a uniform linear movement, taking a movement direction as an X axis, a central point of lighting of the first light source and the second light source as an origin O, a central line of a strip-shaped region of the object to be photographed as a Y axis, and from the origin upwards as a Z axis, centers of the first camera, the second camera, and the first light source and the second light source in the light sources are all in an XOZ plane, wherein the first light source forms an included angle a with the X axis, and the second light source forms an included angle b with the X axis; the first camera is in a reflection bright field of the first light source, the second camera is in a transmission bright field of the first light source, and meanwhile, the first camera is in a reflection dark field of the second light source, and the second camera is in a transmission dark field of the second light source.

Figure 7:
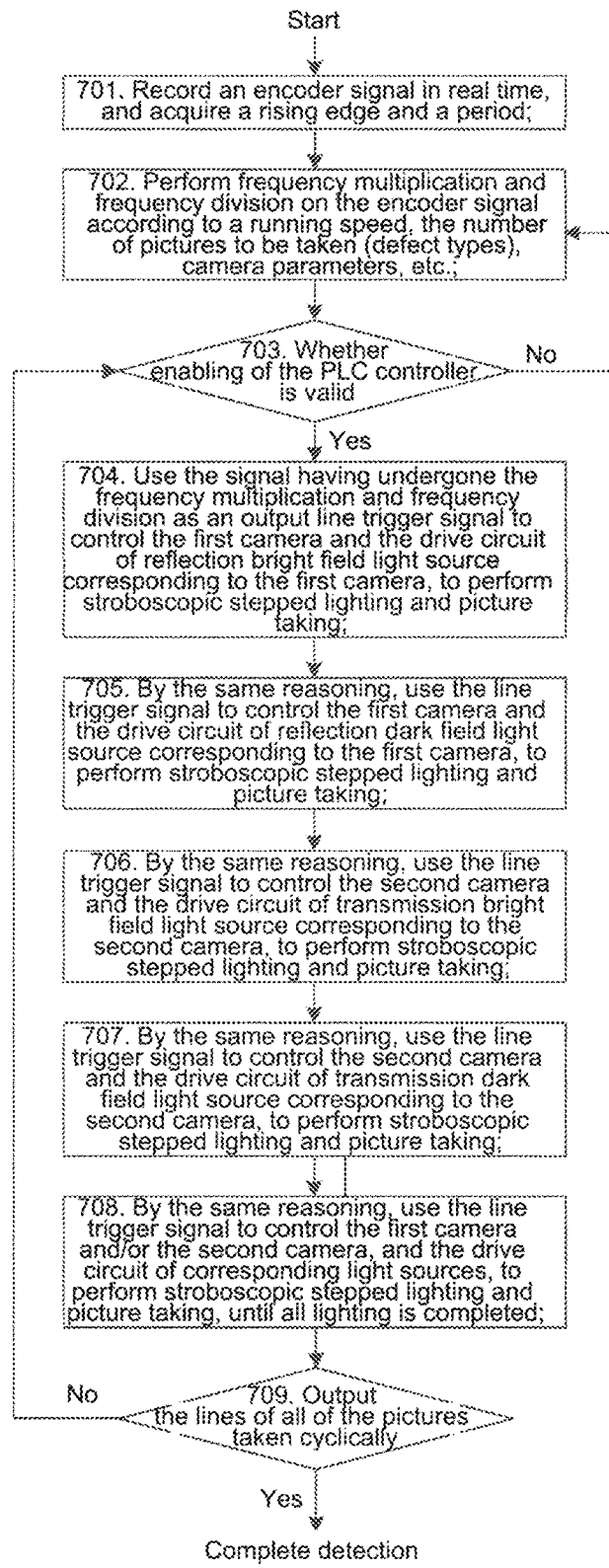
FIG. 7 is a flowchart of an operation method of a stroboscopic control unit according to an embodiment of the present disclosure.

As shown in FIG. 7, it is a flowchart of an operation method of the stroboscopic control unit according to an embodiment of the present disclosure. In the above, an operation method of the stroboscopic control unit (104) is as follows:

701. recording firstly an encoder signal in real time, and acquiring a rising edge and a period;

702. performing frequency multiplication and frequency division on the encoder signal according to a running speed, the number of pictures to be taken (defect types), camera parameters, etc.;

703. judging whether enabling of the PLC controller is valid, wherein if it is not valid, it returns to step 702; and if it is valid, subsequent signal output is performed;

704. using the signal having undergone the frequency multiplication and frequency division as an output line trigger signal to control the first camera and the drive circuit of reflection bright field light source corresponding to the first camera, to perform stroboscopic stepped lighting and picture taking;

705. by the same reasoning, using the line trigger signal to control the first camera and the drive circuit of reflection dark field light source corresponding to the first camera, to perform stroboscopic stepped lighting and picture taking;

706. by the same reasoning, using the line trigger signal to control the second camera and the drive circuit of transmission bright field light source corresponding to the second camera, to perform stroboscopic stepped lighting and picture taking;

707. by the same reasoning, using the line trigger signal to control the second camera and the drive circuit of transmission dark field light source corresponding to the second camera, to perform stroboscopic stepped lighting and picture taking;

708. by the same reasoning, using the line trigger signal to control the first camera and/or the second camera, and the drive circuit of corresponding light sources, to perform stroboscopic stepped lighting and picture taking, until all lighting is completed; and 709. outputting the lines of all of the pictures taken cyclically, wherein if it is not completed, it returns to step 703; and if it is completed, the defect detection of one product is finished.

Figure 8:
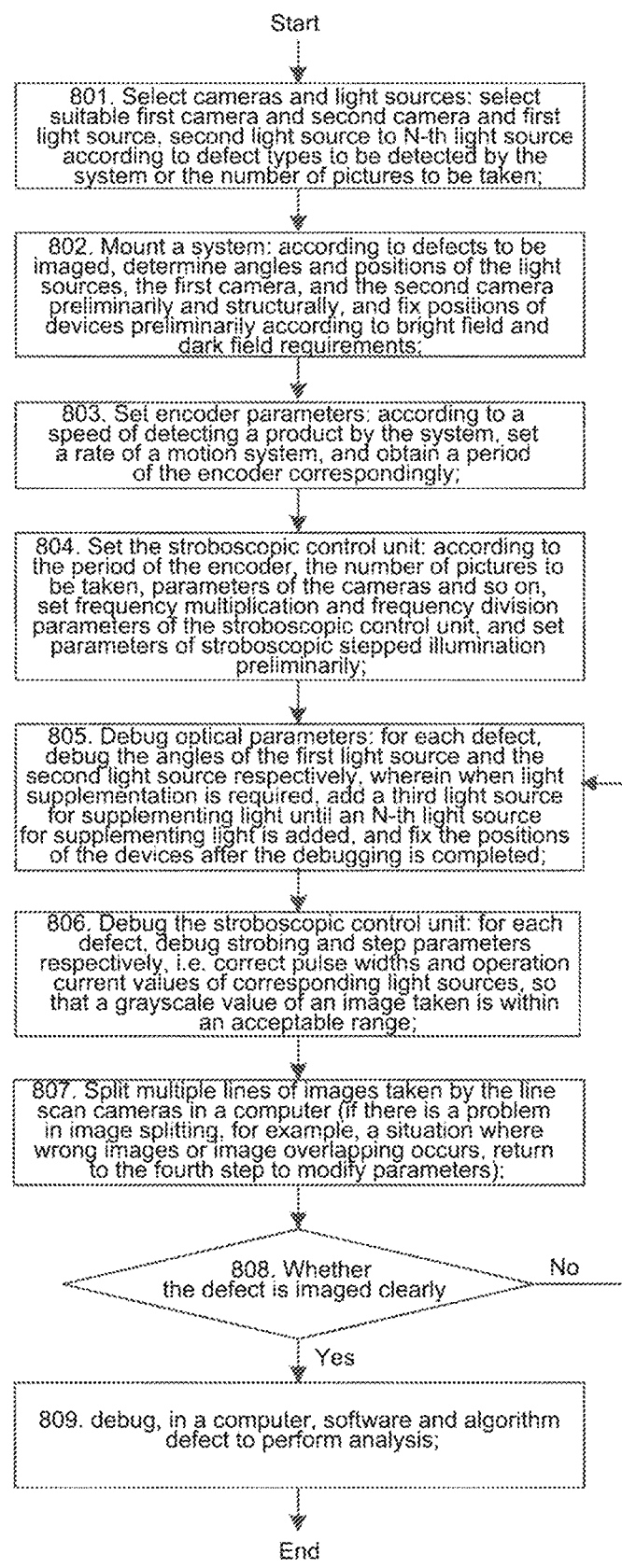
FIG. 8 is a flowchart of a stroboscopic stepped illumination defect detection method according to an embodiment of the present disclosure.

As shown in FIG. 8, it is a flowchart of the stroboscopic stepped illumination defect detection method according to an embodiment of the present disclosure. A machine vision appearance defect detection system with double cameras and stroboscopic stepped control, with a detection method thereof including following procedures:

801. selecting cameras and light sources: selecting suitable first camera and second camera, and first light source, second light source to N-th light source according to defect types to be detected by the system or the number of pictures to be taken;

802. mounting a system: according to defects to be imaged, determining angles and positions of the light sources, the first camera, and the second camera preliminarily and structurally, and fixing positions of devices preliminarily according to bright field and dark field requirements;

803. setting encoder parameters: according to a speed of detecting a product by the system, setting a rate of a motion system, and obtaining a period of the encoder correspondingly;

804. setting the stroboscopic control unit: according to the period of the encoder, the number of pictures to be taken, parameters of the cameras and so on, setting frequency multiplication and frequency division parameters of the stroboscopic control unit, and setting parameters of stroboscopic stepped illumination preliminarily;

805. debugging optical parameters: for each defect, debugging the angles of the first light source and the second light source respectively, wherein when light supplementation is required, adding a third light source for supplementing light until an N-th light source for supplementing light is added, and fixing the positions of the devices after the debugging is completed;

806. debugging the stroboscopic control unit: for each defect, debugging strobing and step parameters respectively, i.e. correcting pulse widths and operation current values of corresponding light sources, so that a grayscale value of an image taken is within an acceptable range;

807. splitting multiple lines of images taken by the line scan cameras in a computer (if there is a problem in image splitting, for example, a situation where wrong images or image overlapping occurs, returning to the fourth step to modify parameters);

808. judging whether the defect is clearly imaged, wherein if not, it returns to the fifth step; and if so, it proceeds forward; and 809. debugging, in a computer, software and algorithm defect to perform analysis.

Embodiment 2

Figure 3:
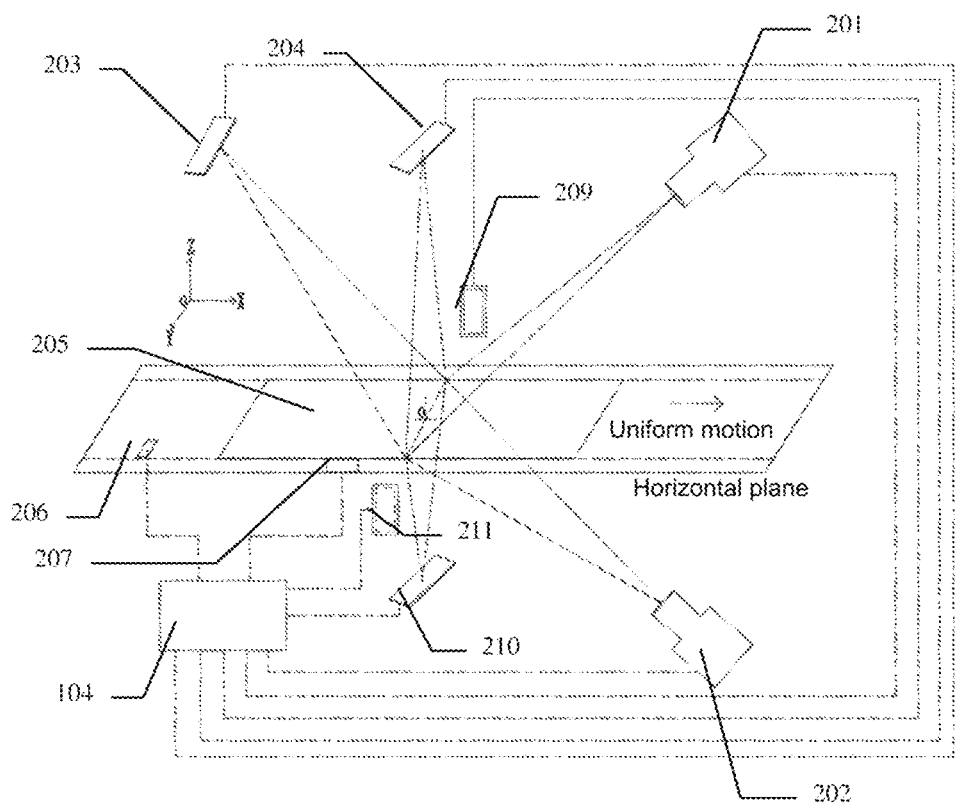
FIG. 3 is a structural schematic diagram of the stroboscopic stepped illumination defect detection system, added with a third light source to an N-th light source for supplementing light, according to an embodiment of the present disclosure.

As shown in FIG. 3, it is a structural schematic diagram of a stroboscopic stepped illumination defect detection system, added with a third light source to an N-th light source for supplementing light, according to an embodiment of the present disclosure. In the above, various components are respectively: a first camera 201, a second camera 202, a first light source 203, a second light source 204, a to-be-detected object 205, an encoder 206, a PLC controller 207, a stroboscopic control unit 104, a third light source 209, a fourth light source 210, and an N-th light source 211.

The first camera and the second camera are line scan cameras; the light sources at least include the first light source and the second light source; the encoder generates a corresponding pulse encoding signal according to a rotating speed of a mechanical rotating system; the PLC controller is a programmable controller, which generates an enable signal after detecting the to-be-detected object and provides the enable signal to the stroboscopic control unit; the stroboscopic control unit (104) includes an input interface circuit, an output interface circuit, a stroboscopic control circuit, and drive circuits of a plurality of light sources.

For a machine vision appearance defect detection system with stroboscopic stepped control, in addition to the first light source and the second light source, the light sources therein further may include the third light source, or the third light source and the fourth light source, or the third light source to the N-th light source, where N is any natural number greater than "3"; positions of the third light source to the N-th light source in principle may be at any point in XYZ three-dimensional coordinates, as long as they do not affect photographing lines of the first camera and the second camera or optical paths of the first light source and the second light source; the third light source to the N-th light source function to cooperate with the first light source and the second light source to supplement light to the to-be-detected object, so that the first camera and the second camera photograph various different defects in appearance of a product.

The third light source and the fourth light source light laterally, for the purpose of laterally supplementing light when the first light source and the second light source light; the N-th light source is placed at the bottom of the to-be-detected object, for lighting the bottom of the to-be-detected object, wherein the function of adding the third light source, the fourth light source, . . . the N-th light source is to make a defect of a complex surface of a product more easy to present; and in operation, the third light source, the fourth light source, and the N-th light source may or may not light as needed. By the same reasoning, the method of adding other light sources to the system is also similar.

An operation method of the stroboscopic control unit (104) and a detection method of the machine vision appearance defect detection system with stroboscopic stepped control are the same as those in the previous embodiment.

Embodiment 3

Figure 4:
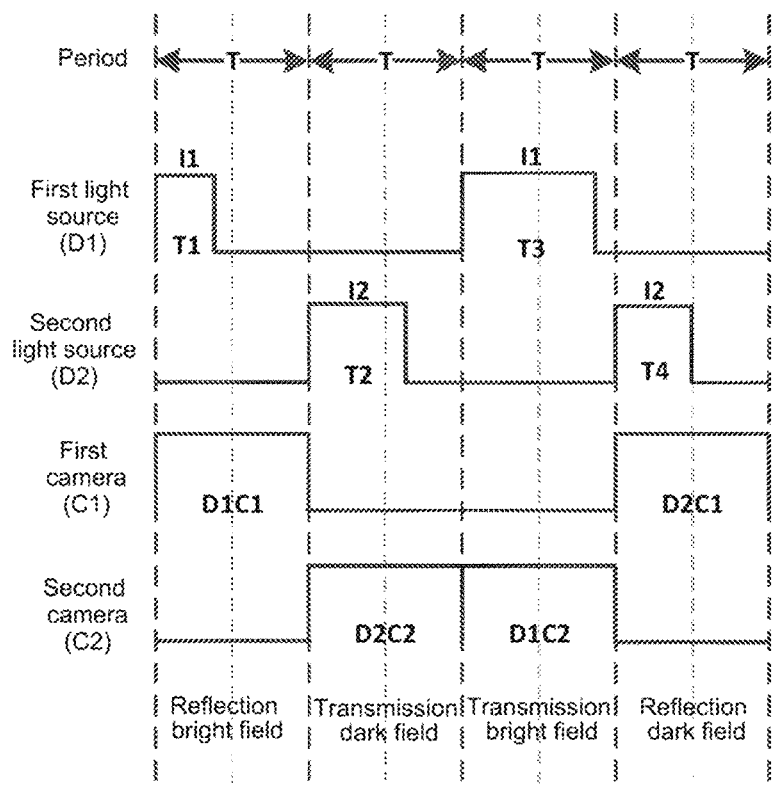
FIG. 4 is a timing diagram of performing stroboscopic illumination photographing in the prior art.

As shown in FIG. 4, FIG. 4 is a timing diagram of performing stroboscopic illumination photographing in the prior art. In the above, when a period of a line frequency signal is T, a first light source, a second light source, a first camera, and a second camera are used to detect and photograph four kinds of defects of a to-be-detected product. It can be seen that in a picture D1C1 taken in a reflection bright field, the first light source is turned on for time T1 and current value is I1 (magnitude of the current value is corresponding to intensity of LED light source); in a picture D2C2 taken in a transmission dark field, the second light source is turned on for time T2 and the current is I2; in a picture D1C2 taken in a transmission bright field, the first light source is turned on for time T3 and the current is I1; in a picture D2C1 taken in a reflection dark field, the second light source is turned on for time T4 and the current is I2; and it can be seen from the above pictures that in conventional stroboscopic illumination, only pulse widths T1, T2, T3, and T4 can be changed, while the operating current I1 corresponding to the first light source and the operating current I2 corresponding to the second light source are fixed.

Figure 5:
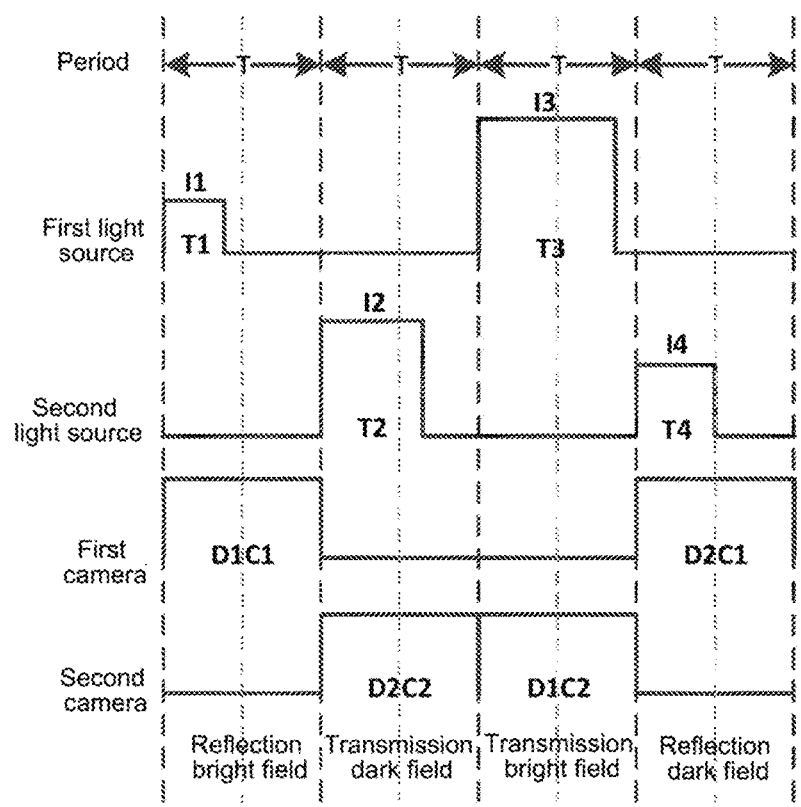
FIG. 5 is a timing diagram of performing stroboscopic stepped illumination photographing by a defect detection method according to an embodiment of the present disclosure.

As shown in FIG. 5, it is a timing diagram of performing stroboscopic stepped illumination photographing by the defect detection method according to an embodiment of the present disclosure. In the above, when a period of a line frequency signal is T, a first light source, a second light source, a first camera, and a second camera are used to detect and photograph four kinds of defects of a to-be-detected product. It can be seen that in a picture D1C1 taken in a reflection bright field, the first light source is turned on for time T1 and a current value is I1 (magnitude of the current value is corresponding to intensity of LED light source light); in a picture D2C2 taken in a transmission dark field, the second light source is turned on for time T2 and the current is I2; in a picture D1C2 taken in a transmission bright field, the first light source is turned on for time T3 and the current is I3; in a picture D2C1 taken in a reflection dark field, the second light source is turned on for time T4 and the current is I4; and it can be seen from the above pictures that in the stroboscopic stepped illumination of the present system, not only the pulse widths T1, T2, T3, and T4 can be changed, but also the operating currents I1 and I3 are corresponding to the first light source and the operating currents I2 and I4 are corresponding to the second light source, i.e. in each period T, the current values can be changed stepwise under different pulse widths, which greatly improves the capability of photographing the defects.

Embodiment 4

Figure 6:
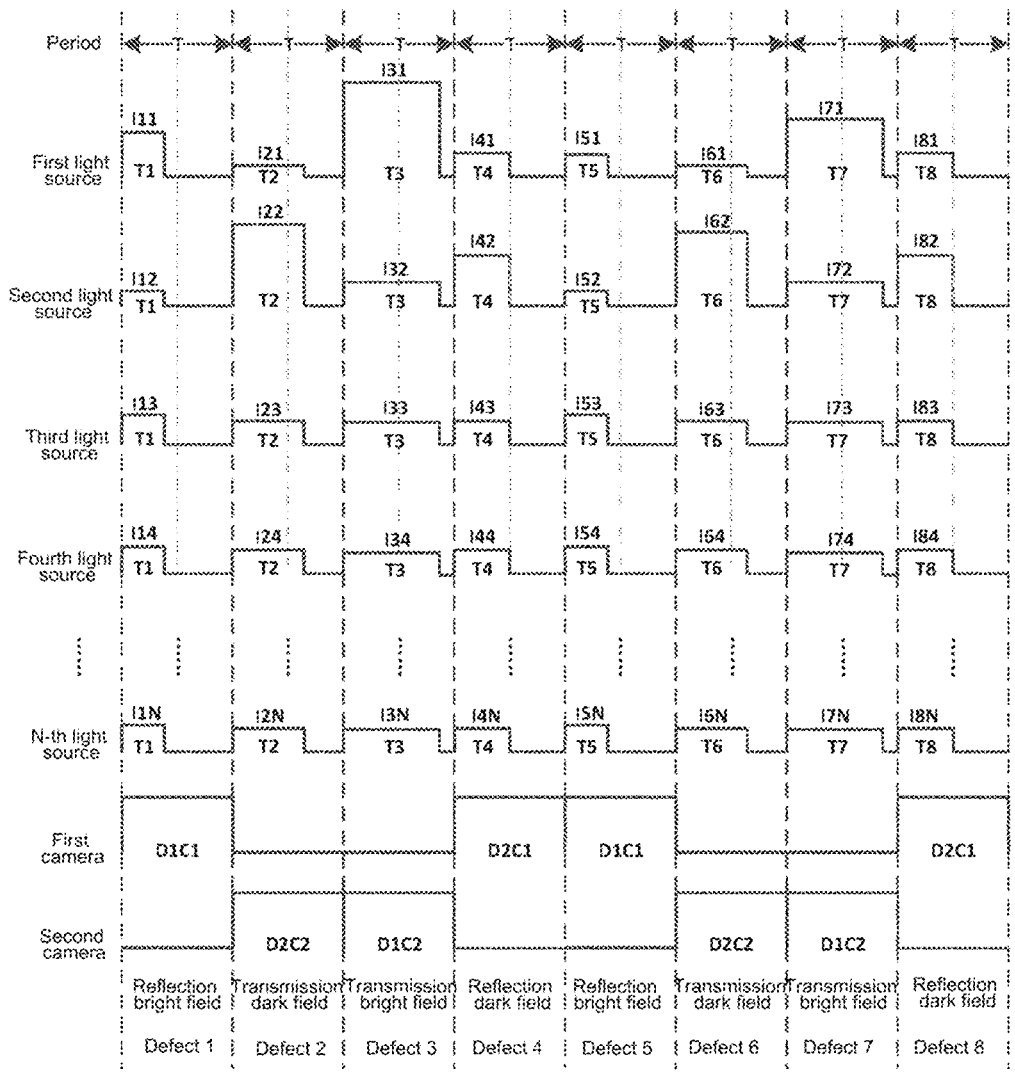
FIG. 6 is a timing diagram of multi-light-source collaborative stroboscopic stepped illumination photographing in the defect detection method according to an embodiment of the present disclosure.

As shown in FIG. 6, it is a timing diagram of multi-light-source collaborative stroboscopic stepped illumination photographing in the defect detection method according to an embodiment of the present disclosure. In the above, a first camera, a second camera, a first light source, a second light source, a third light source, a fourth light source to an N-th light source are used, wherein the first light source and the second light source are main light sources, and the other light sources are auxiliary light sources. In a D1C1 picture of reflection bright field imaging of defect 1, since a pulse width T1 of the light source is adjustable, and current values $I11, I12, I13, I14 \ldots I1N$ corresponding to respective light sources can be separately set; by the same reasoning, in a D2C2 picture of transmission dark field imaging of defect 2, since a pulse width T2 of the light source is adjustable, and current values $I21, I22, I23, I24 \ldots I2N$ corresponding to respective light sources can be set separately; by the same reasoning, in a D1C2 picture of transmission bright field imaging of defect 3, since a pulse width T3 of the light source is adjustable, and current values $I31, I32, I33, I34 \ldots I3N$ corresponding to respective light sources can be separately set; by the same reasoning, in a D2C1 picture of reflection dark field imaging of defect 4, since a pulse width T4 of the light source is adjustable, and current values $I41, I42, I43, I44 \ldots I4N$ corresponding to respective light sources can be separately set; by analogy, a picture of a reflection bright field of defect 5, a picture of a transmission dark field of defect 6, a picture of a transmission bright field of defect 7, and a picture of a reflection dark field of defect 8 can be taken by the same reasoning, and main characteristics of these photographing are that the turning-on pulse widths of the light sources are different, and meanwhile the turning-on current values of each light source can be set separately.

In this way, the requirement that all the light sources operate collaboratively is met, greatly improving the capability of defect illumination detection; and under the same hardware condition, pictures of more defects can be taken, thus improving the efficiency of the whole detection system.

The above-mentioned are merely several embodiments of the present disclosure, but do not limit the present disclosure in any form. Although the present disclosure is disclosed in the above with preferred embodiments, they are not used to limit the present disclosure. Without departing from the scope of the technical solutions of the present disclosure, some changes or modifications made with the technical contents disclosed in the above by any skilled person familiar with the art are equivalent to equivalent embodiments, and all belong to the scope of protection of the technical solutions of the present disclosure.

What is claimed is:

1. A stroboscopic stepped illumination defect detection system, for detecting appearance defects of a product, comprising:
an image extraction unit, a brightness adjusting unit, a data processing unit, and a stroboscopic control unit, wherein
the image extraction unit is connected to the stroboscopic control unit, and is configured to acquire stable and clear images in various transmission/reflection visual bright fields/dark fields;
the brightness adjustment unit is connected to the stroboscopic control unit, and is configured to set various transmission/reflection visual bright fields/dark fields and perform converting in the various transmission/reflection visual bright fields/dark fields;
the data processing unit is connected to the stroboscopic control unit, and is configured to:
generate a pulse encoding signal, generate an enable signal after detecting a to-be-detected product, and transmit the enable signal to the stroboscopic control unit;
the stroboscopic control unit is connected to the image extraction unit, the brightness adjustment unit, and the data processing unit respectively, and is configured to:
record signal transmitted by the data processing unit in real time, and perform frequency multiplication and/or frequency division on the signal;
control, using the signal having undergone the frequency multiplication and/or frequency division, the image extraction unit to acquire an image; and
control, using the signal having undergone the frequency multiplication and/or frequency division, the brightness adjustment unit to set the transmission/reflection visual bright fields/dark fields, and perform converting in various transmission/reflection visual bright fields/dark fields; and
the image extraction unit further comprises a plurality of cameras; and
the brightness adjustment unit further comprises a plurality of light sources, wherein
the stroboscopic control unit is further configured to control the drive circuits of reflection bright field light sources corresponding to various cameras to perform stroboscopic stepped lighting and picture taking, according to the signal having undergone the frequency multiplication and/or frequency division as an output line trigger signal;
the stroboscopic control unit is further configured to control the drive circuits of the reflection dark field light sources corresponding to various cameras to perform stroboscopic stepped lighting and picture taking, according to the signal having undergone the frequency multiplication and/or frequency division as an output line trigger signal;
the stroboscopic control unit is further configured to control the drive circuits of transmission bright field light sources corresponding to various cameras to perform stroboscopic stepped lighting and picture taking, according to the signal having undergone the frequency multiplication and/or frequency division as an output line trigger signal; and
the stroboscopic control unit is further configured to control the drive circuits of the transmission dark field light sources corresponding to various cameras to perform stroboscopic stepped lighting and picture taking, according to the signal having undergone the frequency multiplication and/or frequency division as an output line trigger signal.

2. The stroboscopic stepped illumination defect detection system according to claim 1, wherein
the data processing unit further comprises an encoder and a PLC controller; and the stroboscopic control unit further includes a stroboscopic control circuit, a drive circuit, an input interface circuit, and an output interface circuit;

the encoder generates a corresponding pulse encoding signal according to a rotating speed of a mechanical rotating system;

the PLC controller is a programmable controller, which generates an enable signal after detecting a to-be-detected object and provides the enable signal to the stroboscopic control unit;

the drive circuit is capable of setting a pulse width and a period of an output current under PWM control; is capable of setting different numerical values for the pulse width in each period; and is capable of setting different numerical values for the output current in each pulse width of PWM modulation; and pulse widths and drive currents of each light source in different periods are adjustable.

3. The stroboscopic stepped illumination defect detection system according to claim 1, wherein the image extraction unit further comprises two cameras; and the cameras are line scan cameras.

4. The stroboscopic stepped illumination defect detection system according to claim 1, wherein the drive circuit outputs a constant current signal for driving the brightness adjustment unit.

5. The stroboscopic stepped illumination defect detection system according to claim 1, wherein in the plurality of cameras and the plurality of light sources, a first camera is located in a reflection bright field of a first light source, and a second camera is located in a transmission bright field of the first light source; and meanwhile, the first camera is located in a reflection dark field of a second light source, and the second camera is located in a transmission dark field of the second light source.

6. The stroboscopic stepped illumination defect detection system according to claim 2, wherein the stroboscopic control unit is further configured to record signal of the encoder in real time and acquire a rising edge and a period;

the stroboscopic control unit is further configured to perform the frequency multiplication and/or frequency division on the signal of the encoder according to a running speed, the number of pictures to be taken or defect types, and camera parameters; and the stroboscopic control unit is further configured to judge whether enabling of the PLC controller is valid, wherein if it is not valid, it returns to the preceding step; and if it is valid, subsequent signal output is performed.

7. A stroboscopic stepped illumination defect detection method, comprising:

step 1, selecting cameras and light sources, comprising:

according to defect types to be detected by a system and/or the number of pictures to be taken, selecting a first camera, a second camera, a first light source, and a second light source adapted thereto;

step 2, mounting an imaging system, comprising:

according to defects to be imaged, determining angles and positions of the light sources, the first camera, and the second camera preliminarily and structurally, debugging the angles and positions of the first camera and the second camera for each defect to be tested respectively, wherein when image data needs to be added, adding a supplemental third camera and a supplemental fourth camera until a supplemental M-th camera is added, where M is a positive integer greater than 3; and fixing positions of devices according to bright field and dark field requirements preliminarily;

step 3, setting encoder parameters, comprising:

according to a speed of detecting a product by the system, setting a rate of a motion system, and obtaining a period of the encoder correspondingly;

step 4, setting a stroboscopic control unit, comprising:

according to the period of the encoder, the number of pictures to be taken, and parameters of the cameras, setting frequency multiplication and frequency division parameters of the stroboscopic control unit, and setting parameters of stroboscopic stepped illumination preliminarily, wherein the stroboscopic control unit is configured to record signal of the encoder in real time and acquire a rising edge and a period;

the stroboscopic control unit is configured to perform the frequency multiplication and/or frequency division on the signal of the encoder according to a running speed, the number of pictures to be taken or defect types, and camera parameters;

the stroboscopic control unit is configured to control drive circuits of reflection bright field light sources corresponding to various cameras to perform stroboscopic stepped lighting and picture taking, according to the signal having undergone the frequency multiplication and/or frequency division as an output line trigger signal;

the stroboscopic control unit is configured to control drive circuits of reflection dark field light sources corresponding to various cameras to perform stroboscopic stepped lighting and picture taking, according to the signal having undergone the frequency multiplication and/or frequency division as an output line trigger signal;

the stroboscopic control unit is configured to control drive circuits of transmission bright field light sources corresponding to various cameras to perform stroboscopic stepped lighting and picture taking, according to the signal having undergone the frequency multiplication and/or frequency division as an output line trigger signal; and the stroboscopic control unit is configured to control drive circuits of transmission dark field light sources corresponding to various cameras to perform stroboscopic stepped lighting and picture taking, according to the signal having undergone the frequency multiplication and/or frequency division as an output line trigger signal;

step 5, debugging optical parameters, comprising:

for each defect to be tested, debugging the angles of the first light source and the second light source respectively, wherein when light supplementation is required, adding a supplemental third light source and a supplemental fourth light source until an N-th supplemental light source is added, where N is a positive integer greater than 3; and fixing positions of various devices after the debugging is completed, so that there is no relative displacement or angular rotation therebetween;

step 6, debugging the stroboscopic control unit:

for each defect to be tested, debugging strobing and step parameters respectively, and correcting pulse widths and operation current values of corresponding light sources, so as to ensure that a grayscale value of an image taken falls within an acceptable set range;

step 7, imaging splitting, comprising:
splitting multiple lines of images taken by line scan cameras using a computer system;
step 8, judging imaging definition, comprising:
judging whether image defect imaging definition reaches a set threshold, wherein if the definition does not reaches the set threshold, it returns to step 5; and
if the definition reaches the set threshold, the next step is performed; and
step 9, analyzing data, comprising:
debugging software and algorithm defect using a computer system to perform data analysis and complete the detection.

8. The detection method according to claim 7, wherein the stroboscopic control unit is configured to judge whether enabling of a PLC controller is valid, wherein if it is not valid, it returns to the preceding step; and if it is valid, subsequent signal output is performed.

9. The detection method according to claim 7, wherein the drive circuit is capable of setting a pulse width and a period of an output current under PWM control;
is capable of setting different numerical values for the pulse width in each period; and
is capable of setting different numerical values for the output current in each pulse width of PWM modulation; and
pulse widths and drive currents of each light source in different periods are adjustable.

10. A double-camera stroboscopic stepped illumination defect detection method, using only two cameras, comprising:
step 1, selecting cameras and light sources, comprising:
according to defect types to be detected by a system and/or the number of pictures to be taken, selecting a first camera, a second camera, a first light source, and a second light source adapted thereto;
step 2, mounting an imaging system, comprising:
according to defects to be imaged, determining angles and positions of the light sources, the first camera, and the second camera preliminarily and structurally, and fixing positions of devices according to bright field and dark field requirements preliminarily;
step 3, setting encoder parameters, comprising:
according to a speed of detecting a product by the system, setting a rate of a motion system, and obtaining a period of the encoder correspondingly;
step 4, setting a stroboscopic control unit, comprising:
according to the period of the encoder, the number of pictures to be taken, and parameters of the cameras, setting frequency multiplication and frequency division parameters of the stroboscopic control unit, and setting parameters of stroboscopic stepped illumination preliminarily, wherein
the stroboscopic control unit is configured to record signal of the encoder in real time and acquire a rising edge and a period;
the stroboscopic control unit is configured to perform the frequency multiplication and/or frequency division on the signal of the encoder according to a running speed, the number of pictures to be taken or defect types, and camera parameters;
the stroboscopic control unit is configured to control drive circuits of reflection bright field light sources corresponding to various cameras to perform stroboscopic stepped lighting and picture taking, according to the signal having undergone the frequency multiplication and/or frequency division as an output line trigger signal;
the stroboscopic control unit is configured to control drive circuits of reflection dark field light sources corresponding to various cameras to perform stroboscopic stepped lighting and picture taking, according to the signal having undergone the frequency multiplication and/or frequency division as an output line trigger signal;
the stroboscopic control unit is configured to control drive circuits of transmission bright field light sources corresponding to various cameras to perform stroboscopic stepped lighting and picture taking, according to the signal having undergone the frequency multiplication and/or frequency division as an output line trigger signal; and
the stroboscopic control unit is configured to control drive circuits of transmission dark field light sources corresponding to various cameras to perform stroboscopic stepped lighting and picture taking, according to the signal having undergone the frequency multiplication and/or frequency division as an output line trigger signal;
step 5, debugging optical parameters, comprising:
for each defect to be tested, debugging angles of the first light source and the second light source respectively, wherein when light supplementation is required, adding a supplemental third light source and a supplemental fourth light source until an N-th supplemental light source, where N is a positive integer greater than 3; and
fixing positions of various devices after the debugging is completed, so that there is no relative displacement or angular rotation therebetween;
step 6, debugging the stroboscopic control unit, comprising:
for each defect to be tested, debugging strobing and step parameters respectively, and correcting pulse widths and operation current values of corresponding light sources, so as to ensure that a grayscale value of an image taken falls within an acceptable set range;
step 7, splitting images, comprising:
splitting multiple lines of images taken by line scan cameras using a computer system;
step 8, judging imaging definition, comprising:
judging whether image defect imaging definition reaches a set threshold, wherein if the definition does not reaches the set threshold, it returns to step 5; and
if the definition reaches the set threshold, the next step is performed; and
step 9, analyzing data, comprising:
debugging software and algorithm defect using a computer system to perform data analysis and complete the detection.

11. The detection method according to claim 10, wherein the stroboscopic control unit is configured to judge whether enabling of a PLC controller is valid, wherein if not, it returns to the preceding step; and
if so, subsequent signal output is performed.

12. The detection method according to claim 10, wherein the drive circuit is capable of setting a pulse width and a period of an output current under PWM control;
is capable of setting different numerical values for the pulse width in each period; and
is capable of setting different numerical values for the output current in each pulse width of PWM modulation; and pulse widths and drive currents of each light source in different periods are adjustable.

* * * * *